United States Patent
McCarty et al.

(10) Patent No.: US 10,599,836 B2
(45) Date of Patent: Mar. 24, 2020

(54) IDENTIFICATION OF VISUAL INTERNATIONAL DOMAIN NAME COLLISIONS

(71) Applicant: VERISIGN, INC., Reston, VA (US)

(72) Inventors: Benjamin McCarty, Washington, DC (US); Preston Zeh, Washington, DC (US)

(73) Assignee: VERISIGN, INC., Reston, VA (US)

(*) Notice: Subject to any disclaimer, the term of this patent is extended or adjusted under 35 U.S.C. 154(b) by 204 days.

(21) Appl. No.: 15/675,641

(22) Filed: Aug. 11, 2017

(65) Prior Publication Data

US 2019/0050559 A1 Feb. 14, 2019

(51) Int. Cl.
*G06F 21/55* (2013.01)
*H04L 29/06* (2006.01)
*H04L 29/12* (2006.01)

(52) U.S. Cl.
CPC .......... *G06F 21/55* (2013.01); *H04L 63/1441* (2013.01); *H04L 63/1483* (2013.01); *H04L 61/1511* (2013.01); *H04L 61/302* (2013.01); *H04L 63/1408* (2013.01); *H04L 63/1458* (2013.01)

(58) Field of Classification Search
None
See application file for complete search history.

(56) References Cited

U.S. PATENT DOCUMENTS

| | | | | |
|---|---|---|---|---|
| 9,762,612 | B1* | 9/2017 | Schiffman | H04L 41/0631 |
| 9,882,933 | B1* | 1/2018 | Schiffman | H04L 63/1483 |
| 2005/0086224 | A1* | 4/2005 | Franciosa | G06F 16/3334 |
| 2010/0269174 | A1* | 10/2010 | Shelest | H04L 29/12066 |
| | | | | 726/22 |
| 2015/0169995 | A1* | 6/2015 | Panferov | G06K 9/00463 |
| | | | | 382/182 |
| 2016/0006731 | A1* | 1/2016 | Zisapel | G06F 21/32 |
| | | | | 726/5 |
| 2016/0342838 | A1* | 11/2016 | Shah | G06K 9/00671 |

OTHER PUBLICATIONS

Hannay, "Assessment of Internationlised Domain Name Homograph Attack Mitigation", Australian Information Security Management Conference, 2009, pp. 1-7. (Year: 2009).*
Helfrich, "Dual Canonicalization: An Answer to the Homograph Attack", 2012, pp. 1-10. (Year: 2012).*
Roshanbin, "Finding Homoglyphs—A Step towards Detecting Unicode-Based Visual Spoofing Attacks", 2011, pp. 1-2. (Year: 2011).*

* cited by examiner

*Primary Examiner* — Benjamin E Lanier
(74) *Attorney, Agent, or Firm* — Artegis Law Group, LLP (57) ABSTRACT

Various embodiments of the invention disclosed herein provide techniques for detecting a homograph attack. An IDN collision detection server retrieves a first domain name that includes a punycode element. The IDN collision detection server converts the first domain into a second domain name that includes a Unicode character corresponding to the punycode element. The IDN collision detection server converts the second domain name into an image. The IDN collision detection server performs one or more optical character recognition operations on the image to generate a textual string associated with the image. The IDN collision detection server determines that the textual string matches at least a portion of a third domain name.

18 Claims, 10 Drawing Sheets

| PUNYCODE IDN 320 | CODE POINTS 330 | UNICODE IDN 340 |
|---|---|---|
| xn--erisign-rof.com | 03BD 0065 0072 0069 0073 0069 0067 006E | verisign.com |
| xn--vrisign-7gg.com | 0076 0435 0072 0069 0073 0069 0067 006E | verisign.com |
| xn--versgn-k91ab.com | 0076 0065 0072 0069 13A5 0073 0069 0067 006E | verisign.com |
| xn--veriign-mog.com | 0076 0065 0072 0069 0455 0069 0067 006E | verisign.com |
| xn--verisig-rjd.com | 0076 0065 0072 0069 0073 0069 0067 0274 | verisign.com |

| PUNYCODE IDN 620 | CODE POINTS 630 | UNICODE IDN 640 |
|---|---|---|
| xn--eriign-vk2al.com | 13D9 0065 0072 0069 13DA 0069 0067 006E | VeriSign.com |
| xn--koa929fzb9c7ai413cba.com | 13D9 13AC 13D2 16C1 13DA 16C1 13C0 0274 | VᴇʀɪSɪɢɴ.com |

610(1) → row 1
610(2) → row 2

IDENTIFICATION OF VISUAL INTERNATIONAL DOMAIN NAME COLLISIONS

BACKGROUND OF THE INVENTION

Field of the Invention

The present invention relates generally to computer network security and, more specifically, to identifying visual international domain name collisions.

Description of the Related Art

In the domain of computer networks, computer systems that present websites and other content to a public network, such as the internet, are generally accessed via a human-readable domain name that is typed into a search window of a web browser or accessed via a hyperlink contained in an electronic document or email. These domain names are defined by the domain name system (DNS) and typically consist of a standard set of alphanumeric ASCII characters and certain punctuation characters. For example, the characters of a domain name could be restricted to the 26 uppercase letters and 26 lowercase letters of the English language, the numbers 0-9, a hyphen '-' character, and a period '.' character. Characters not included in this standard character set would be considered "non-standard" and could not be included in a DNS-compatible domain name. Computer fonts can and do define international language characters, such as Greek, Cyrillic, Arabic, and Chinese characters, via standards such as the Unicode standard. However, international language characters currently cannot be directly included in a DNS-compatible domain name.

Document RFC 3492 from the Internet Engineering Task Force (IETF) attempts to address the issue of including international language characters in domain names. RFC 3492 defines a mechanism, referred to herein as "punycode," that allows characters that are not included in the DNS character set to be inserted into a domain name. Typically, a domain name that includes one or more international characters is expressed as an international domain name (IDN). An IDN begins with the characters "xn- -" followed by characters of the domain name that are included in the standard DNS-compatible character set. Next, the IDN includes a punycode representation that identifies one or more non-standard characters along with the position of those non-standard characters within the domain name. The IDN concludes with a top level domain (TLD) such as .com or .net.

Despite the advantages of the above approach, the introduction of IDNs has enabled a particular type of spoofing attack referred to as a "homograph" attack. In a homograph attack, a malicious entity registers an IDN that appears to be visually similar or identical to an already existing domain name. Users who access the IDN registered by the malicious entity typically believe they are actually accessing web content associated with the already existing domain name. The malicious entity can then retrieve sensitive information from the users, install malicious software on the users' computers, or perform other malicious activities. Homograph attacks are facilitated by the fact that many international language characters are similar or identical to characters in the standard DNS-compatible character set. In one example, a malicious entity could register the IDN "xn- -oogle-wmc.com" via a registration service. When a web browser displays this IDN, the punycode element "-wmc" would direct the web browser to place a Latin small capital letter "G" in front of the characters "oogle"—resulting in the domain name ɢoogle.com. Users accessing Google.com would then be directed to the IDN registered by the malicious user rather than to the expected home page of google.com. Further, such homograph attacks are difficult to detect because malicious IDNs that include one or more punycode elements are readily comparable with the corresponding previously registered domain name. For example, an ASCII string comparison of the malicious IDN "xn- -oogle-wmc.com" against the domain name "google.com" would not result in a match.

One way that homograph attacks can be identified is by maintaining a list of IDNs that includes punycode elements that result in domain names that are visually similar to other registered domain names. For example, such a list could identify that the IDN "xn- -oogle-wmc.com" is visually similar to the "google.com" domain name. One drawback with this approach, though, is that the entire set of possible IDNs that are visually similar to other domains is difficult to determine in advance because there are so many possible homographs for any given domain name. Another drawback with the above approach is that fonts are constantly being revised with new characters, and new fonts are constantly being introduced. As a result, any list of potential homographs would become obsolete quite quickly as existing fonts are revised and new fonts are introduced.

As the foregoing illustrates, what is needed in the art are more effective ways of identifying and mitigating homograph attacks.

SUMMARY OF THE INVENTION

Various embodiments of the present application set forth a method for detecting a homograph attack. The method includes retrieving a first domain name that includes a punycode element. The method further includes converting the first domain into a second domain name that includes a Unicode character corresponding to the punycode element. The method further includes converting the second domain name into an image. The method further includes performing one or more optical character recognition operations on the image to generate a textual string associated with the image. The method further includes determining that the textual string matches at least a portion of a third domain name.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that potentially malicious IDNs associated with homograph attacks are automatically detected shortly after the malicious IDNs are registered. IDNs that are visually similar to previously registered domain names are automatically detected without the need to manually update a registry of malicious IDNs. As a result, the malicious IDNs are detected and mitigated in less time relative to prior approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
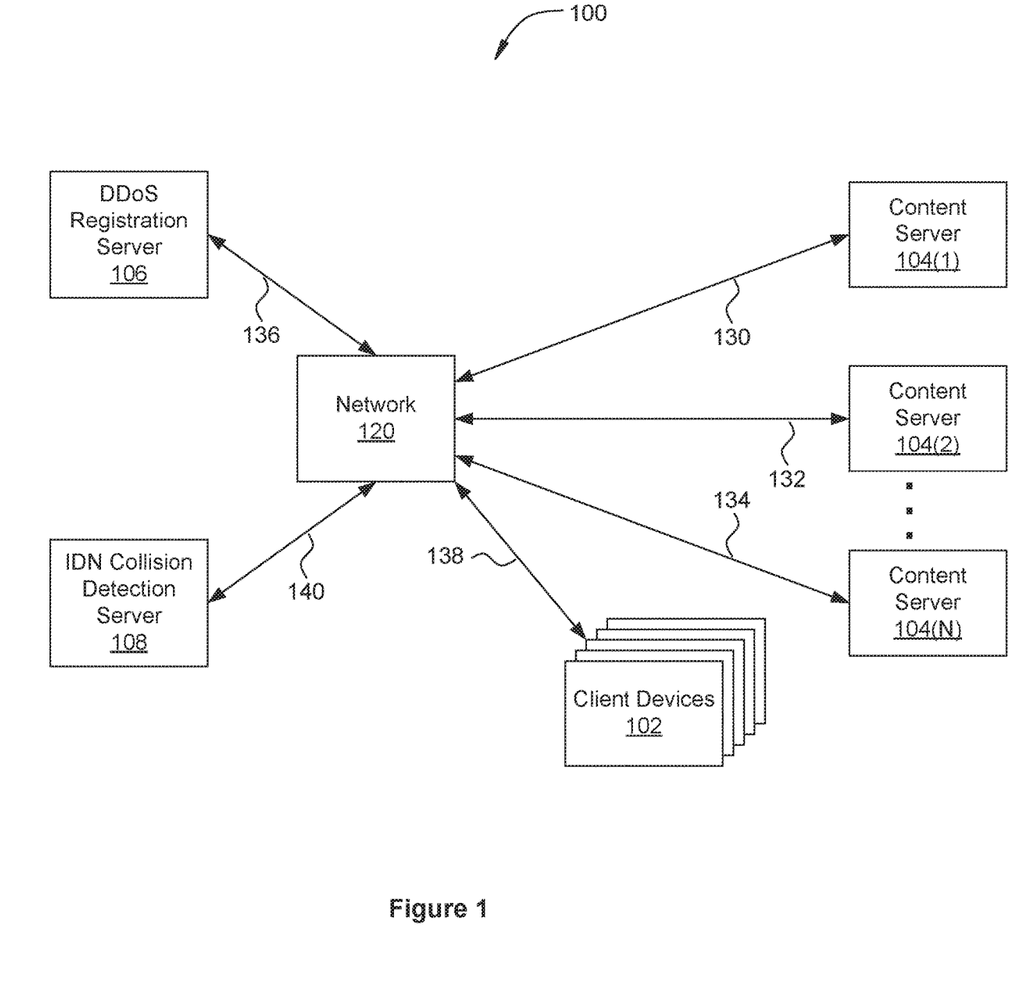
FIG. 1 illustrates a system configured to implement one or more aspects of the present invention.

FIG. 1 illustrates a system 100 configured to implement one or more aspects of the present invention. As shown, the system includes, without limitation, client devices 102, content servers 104(1), 104(2), . . . 104(N), a DNS registration server 106, and an IDN collision detection server 108 in communication with each other via a network 120. Network 120 may be any suitable environment to enable communications among remote or local computer systems, including, without limitation, cross connect systems within a data center, dedicated low-latency networks, LANs (Local Area Networks), and internet-based WANs (Wide Area Networks).

Each of client devices 102 includes a computing device that may be a personal computer, video game console, personal digital assistant, mobile phone, mobile device, or any other device suitable for implementing one or more aspects of the present invention. Illustratively, client devices 102 communicate over network 120 via communications link 138. Client devices 102 transmit network messages that include requests for specific content from one or more of content servers 104(1), 104(2), . . . 104(N). Upon receiving the requested content from content servers 104(1), 104(2), . . . 104(N), client devices 102 perform further processing on the requested content, including, without limitation, analyzing the requested content and displaying the requested content on a display device.

Each of content servers 104(1), 104(2), . . . 104(N) includes a computing device that may be a personal computer, video game console, personal digital assistant, mobile phone, mobile device, or any other device suitable for implementing one or more aspects of the present invention. Content servers 104(1), 104(2), and 104(N) communicate with client devices 102 via communications links 130, 132, and 134, respectively. Communications links 130, 132, and 134 may be any technically feasible communication channel, including, without limitation, point-to-point communications channels, one or more LANs, and one or more internet-based WANs. In response to receiving network messages that include requests for specific content, content servers 104(1), 104(2), . . . 104(N) retrieve and transmit network messages that include the requested content to client devices 102 via communications links 130, 132, and 134, respectively. Further, each of content servers 104(1), 104(2), . . . 104(N) registers one or more domain names with DNS registration server 106.

DNS registration server 106 includes a computing device that may be a personal computer, server, router, or any other device suitable for implementing one or more aspects of the present invention. Illustratively, DNS registration server 106 communicates over network 120 via communications link 136. In operation, DNS registration server 106 accepts domain registration requests from content servers 104(1), 104(2), . . . 104(N). These domain registrations requests include registration requests for regular domain names that include only characters from the standard DNS-compatible character set. These domain registrations requests also include registration requests for IDNs that include punycode elements specifying one or more non-standard characters, such as international language characters. Further, one or more of content servers 104(1), 104(2), . . . 104(N) may launch a homograph attack by maliciously registering an IDN with DNS registration server 106 that is visually similar to another existing domain name. In response, DNS registration server 106 registers the domain names requested by content servers 104(1), 104(2), . . . 104(N). DNS registration server 106 maintains a list of registered domain names and provides the list of registered domain names to IDN collision detection server 108 upon request.

IDN collision detection server 108 includes a computing device that may be a personal computer, server, router, or any other device suitable for implementing one or more aspects of the present invention. Illustratively, IDN collision detection server 108 communicates over network 120 via communications link 140. In operation, IDN collision detection server 108 periodically transmits requests for newly registered domain names to DNS registration server 106. In response, DNS registration server 106 transmits the list of newly registered domain names to IDN collision detection server 108. In one example, IDN collision detection server 108 could transmit requests daily to DNS registration server 106 to request a list of domain names that have been registered within the last twenty-four hours or since the last request was transmitted.

As further described herein, IDN collision detection server 108 filters newly registered domain names to identify IDNs with one or more punycode elements. IDN collision detection server 108. IDN collision detection server 108 processes the identified IDNs to determine whether one or more IDNs is visually similar to a previously registered domain name. If an IDN is visually similar to a previously registered domain name, then IDN collision detection server 108 performs an appropriate action, such as alerting the content server 104 associated with the owner of the previously registered domain name or alerting other client devices 102 that may access the previously registered domain name.

In addition, IDN collision detection server 108 identifies IDNs that are visually similar to an existing domain name composed of standard DNS-compliant characters. IDN collision detection server 108. IDN collision detection server 108 processes the existing domain name and compares the existing domain name with one and two character combinations present in various fonts. IDN collision detection server 108 then generates a list of IDNs that are visually similar to the existing domain name. These one or more visually similar IDNs may be registered as a "vanity" domain name, such as when the visually similar IDN is stylistically pleasing. In addition, or alternatively, visually similar IDNs may be registered as a preventive measure to reduce the possibility of a homograph attack. IDN collision detection server 108 is now described in further detail.

Dynamic Allocation for Disseminating Threat Information

Figure 2:
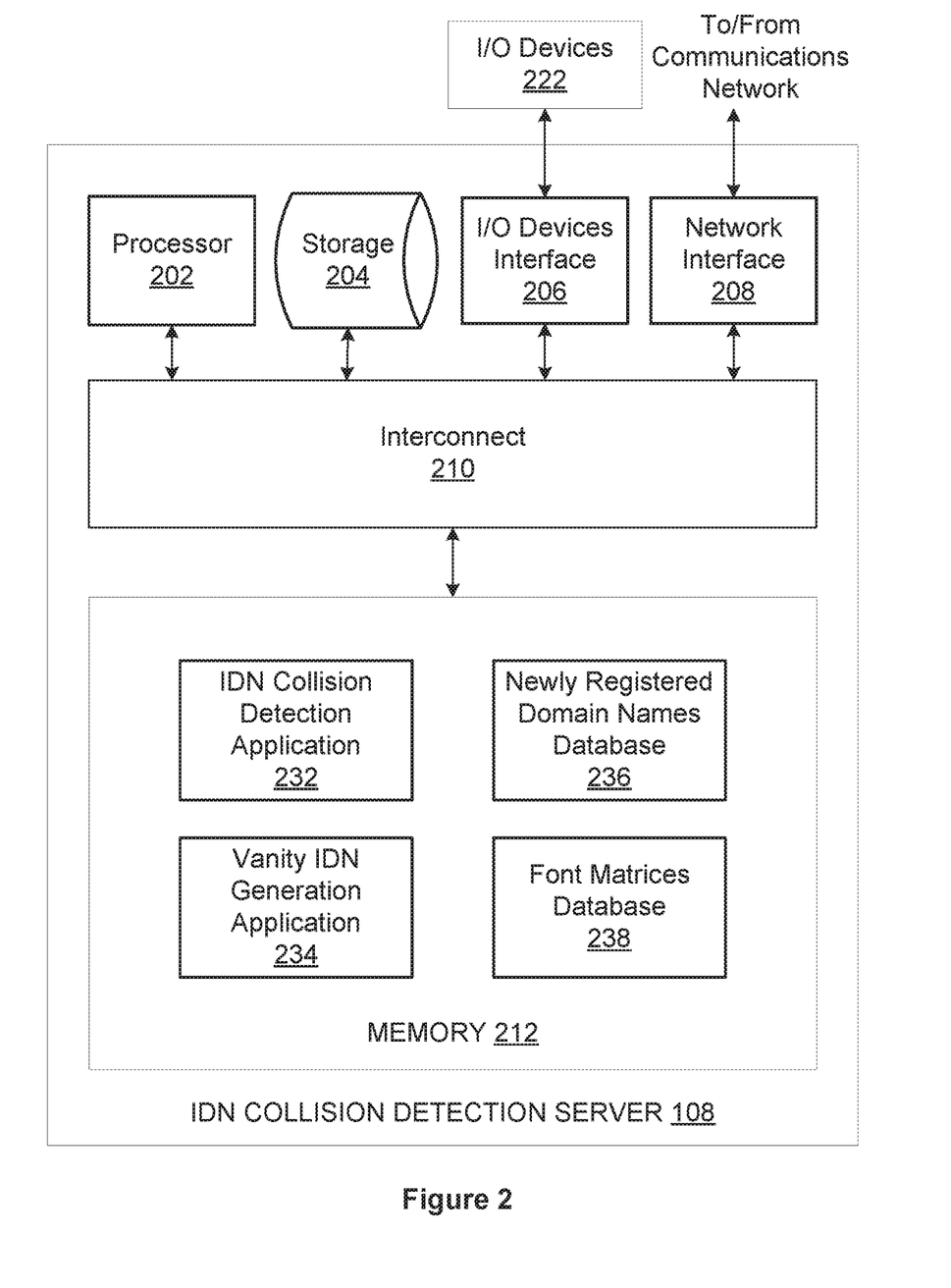
FIG. 2 is a more detailed illustration of the IDN collision detection server of FIG. 1, according to various embodiments of the present invention.

FIG. 2 is a more detailed illustration of the IDN collision detection server 108 of FIG. 1, according to various embodiments of the present invention. As shown, IDN collision detection server 108 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmissionm such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, an IDN collision detection application 232, a vanity IDN generation application 234, a newly registered domain names database 236, and a font matrix database 238.

The IDN collision detection application 232, when executed by the processor 202, performs one or more operations associated with IDN collision detection server 108 of FIG. 1, as further described herein. In operation, IDN collision detection application 232 periodically transmits requests for newly registered domain names to DNS registration server 106. In response, DNS registration server 106 transmits the list of newly registered domain names to IDN collision detection application 232. In one example, IDN collision detection application 232 could transmit requests daily to DNS registration server 106 to request a list of domain names that have been registered within the last twenty-four hours or since the last request was transmitted. IDN collision detection application 232 stores the received list of domain names in newly registered domain names database 236.

IDN collision detection application 232 filters the domain names stored in newly registered domain names database 236 to identify IDNs with one or more punycode elements. In some embodiments, IDN collision detection application 232 identifies IDNs with punycode elements as those domain names that begin with a "xn- -" character string. Upon detecting an IDN with one or more punycode elements, IDN collision detection application 232 converts the domain name to an IDN that includes Unicode characters corresponding to the punycode elements. IDN collision detection application 232 then renders the IDN with Unicode characters into multiple images corresponding to different fonts into which the IDN can be rendered. In some embodiments, IDN collision detection application 232 may enlarge each image to facilitate optical character recognition (OCR). IDN collision detection application 232 performs one or more OCR operations on the rendered images to generate a textual string of recognized characters for each image. In some embodiments, IDN collision detection application 232 may perform a relaxed or "lazy" OCR operation, whereby Unicode characters are mapped to a standard DNS-compliant character that is visually similar to the Unicode character, even if a more rigorous OCR could detect a difference between the standard DNS-compliant character and the Unicode character.

The textual string from the OCR operation is compared to a list of previously registered domain names. The list of previously registered domain names could include a list of preferred clients. If a textual string from the OCR operation matches a domain name belonging to a preferred client, then IDN collision detection application 232 performs an appropriate action. For example, IDN collision detection application 232 could notify the preferred client that a domain name belonging to the preferred client may be the subject of a homograph attack.

Similarly, the list of previously registered domain names could include a list of popular domain names, such as the 100,000 most popular sites on the internet. A homograph attack on a popular domain name could indicate particular types of attack, such as a supply chain attack or a watering hole attack. In a supply chain attack, a malicious entity attacks particular websites that companies typically utilize for at various stages of manufacturing or delivering products and services. For example, a supply chain attack could target websites belong to suppliers or raw materials, contract manufacturing services, or shipping logistics servers. In a watering hole attack, a malicious entity attacks particular websites that are regularly used by the targeted company, such as search engine websites, office supply websites, and cloud services websites. If a homograph attack is detected against a popular website, then IDN collision detection application 232 places the newly registered IDN and the corresponding popular domain name in a suspicious domain names list.

In some embodiments, a particular font may not include a character image, or glyph, for every possible code point. In such embodiments, a specific character, such as a question mark or a diamond shape, may be substituted as a substitute character image for these code points. When a lazy OCR is performed on an image that includes one or more substitute character images, and if the textual string resulting from the OCR operation matches a domain name in the list of previously registered domain names, then the presence of the substitute character image overrides the match. In such cases, IDN collision detection application 232 determines that no match is found. Stated another way, IDN collision detection application 232 determines that a Unicode character included in the Unicode IDN is not defined in the current font associated with the Unicode IDN. In response, IDN collision detection application 232 identifies the IDN as a non-suspicious domain name even if the textual string resulting from the OCR operation matches a domain name in the list of previously registered domain names.

In addition, or alternatively, IDN collision detection application 232 could perform other appropriate actions, including, without limitation, transmitting an alert to a system operator regarding the newly registered IDN, transmitting a request to DNS registration server 106 to delete the newly registered IDN from the domain name registry, and sending an email regarding the newly registered IDN to a user associated with the owner of a targeted popular domain name.

The vanity IDN generation application 234, when executed by the processor 202, performs one or more operations associated with IDN collision detection server 108 of FIG. 1, as further described herein. In operation, vanity IDN generation application 234 generates IDNs that are visually similar to another domain name. Vanity IDN generation application 234 generates a master list of all one-character (1-gram) and two-character (2-gram) combinations of the standard DNS-compliant character set. For example, the master list for a 64-character set would include 64 1-grams and $64^2$ (4,096) 2-grams, for a total of 4,160 combinations. The master list for a 63-character set would include 63 1-grams and $64^2$ (3,969) 2-grams, for a total of 4,032 combinations.

Similarly, vanity IDN generation application 234 generates a list of all 1-grams and 2-grams for each known font. For example, a fully-populated font could have 65,535 code points, where a code point is a hexadecimal number in the range of 0x0000 to 0xFFFF hexadecimal. Each code point would correspond to a different Unicode character and to a different glyph representation. The combination list for such a font would include would include 65,535 1-grams and $65,535^2$ (approximately 4.3 billion) 2-grams. Vanity IDN generation application 234 performs a lazy OCR operation on each 1-gram and 2-gram for a given font. Vanity IDN generation application 234 compares the output of each OCR operation against the 1-grams and 2-grams of the standard DNS-compliant character set. Any matches between the combinations of the current font and the combinations of the standard DNS-compliant character set are stored in font matrix database 238. Vanity IDN generation application 234 repeats this process for each known font. As a result, font matrix database 238 includes a mapping table for each known font.

Vanity IDN generation application 234 retrieves a currently existing or newly registered domain name, referred to as the input domain name. Vanity IDN generation application 234 generates all sequential 1-gram and 2-gram combinations present in the input domain name. Vanity IDN generation application 234 selects a font and a corresponding font matrix in font matrix database 238. For each 1-gram and 2-gram present in the input domain name, vanity IDN generation application 234 identifies the corresponding 1-grams and 2-grams in the font matrix, and retrieves the corresponding 1-grams and 2-grams in the font that appear visually similar to the 1-gram and 2-gram of the input domain name. Vanity IDN generation application 234 combines the 1-grams and 2-grams in the font to generate a list of stylized domain names that appear visually similar to the input domain name. One or more of these stylized domain names may be registered as a vanity domain name. In addition, or alternatively, these stylized domain names may be registered to reduce the risk of homograph attacks. Stylized domain names selected for registration are converted to punycode IDNs and registered with a DNS registration server, such as DNS registration server 106.

In some embodiments, vanity IDN generation application 234 may not be limited to processing 1-grams and 2-grams. In general, vanity IDN generation application 234 may be configured to process combinations of any length. Such combinations may be referred to as n-grams, where 'n' may be any positive integer.

In some embodiments, vanity IDN generation application 234 may generate or update font matrix database 238 periodically. In addition, or alternatively, vanity IDN generation application 234 may generate or update font matrix database 238 whenever a new font is detected or an existing font is revised.

Figure 3:
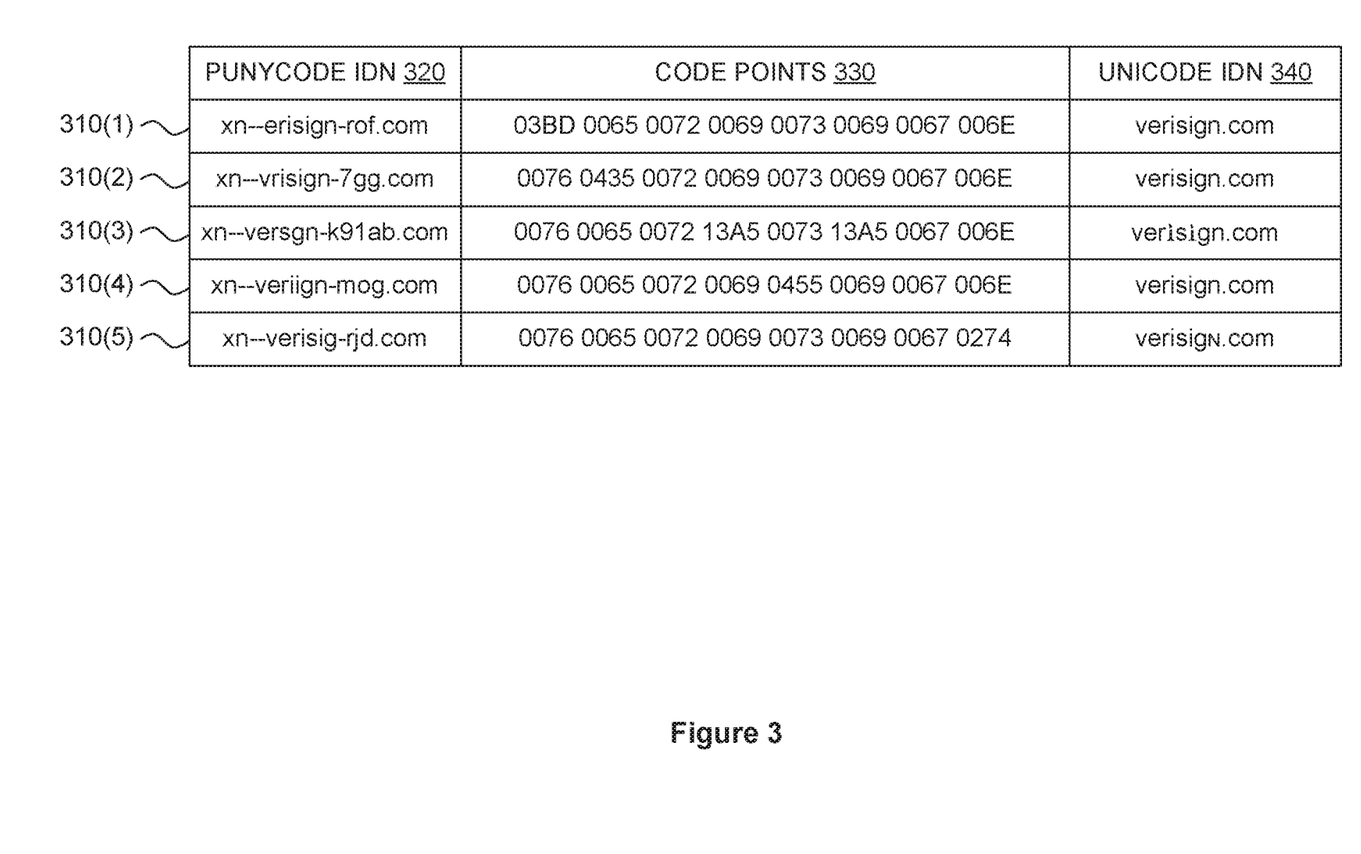
FIG. 3 illustrates examples of different IDNs that correspond to a homograph attack, according to various embodiments of the present invention.

FIG. 3 illustrates examples 310(1) . . . 310(5) of different IDNs that correspond to a homograph attack, according to various embodiments of the present invention. As shown, each of examples 310(1) . . . 310(5) includes a punycode IDN 320, code points 330, and a Unicode IDN 340. Each of the examples 310(1) . . . 310(5) defines a homograph IDN corresponding to the verisign.com domain.

In example 310(1), the letter 'v' in the word "verisign" has been replaced by an alternate letter 'v' from the Unicode font set. The punycode IDN 320 "xn- -erisign-rof.com" corresponding to example 310(1) includes punycode element "-rof." This punycode element indicates that an alternative character for the letter 'v' is to be inserted in the first position of the domain name. The resulting code points 330 after the insertion are 03BD 0065 0072 0069 0073 0069 0067 006E, where 03BD is the code point 330 for the alternative letter 'v' in the first position and the remaining code points 330 respectively correspond to the standard characters in the string "erisign." The resulting Unicode IDN 340 is "verisign.com" which is visually similar to the original domain name.

In example 310(2), the letter 'e' in the word "verisign" has been replaced by an alternate letter 'e' from the Unicode font set. The punycode IDN 320 "xn- -vrisign-7gg.com" corresponding to example 310(2) includes punycode element "-7gg." This punycode element indicates that an alternative character for the letter 'e' is to be inserted in the second position of the domain name. The resulting code points 330 after the insertion are 0076 0435 0072 0069 0073 0069 0067 006E, where 0435 is the code point 330 for the alternative letter 'e' in the second position and the remaining code points 330 respectively correspond to the standard characters in the string "vrisign." The resulting Unicode IDN 340 is "verisign.com" which is visually similar to the original domain name.

In example 310(3), the letters 'i' in the word "verisign" has been replaced by an alternate letter 'i' from the Unicode font set. The punycode IDN 320 "xn- -versgn-k91ab.com" corresponding to example 310(2) includes punycode element "-k91ab." This punycode element indicates that an alternative character for the two letters 'i' is to be inserted in the fourth and sixth positions of the domain name. The resulting code points 330 after the insertion are 0076 0065 0072 13A5 0073 13A5 0067 006E, where 13A5 is the code point 330 for the alternative letter 'i' in the fourth and sixth positions and the remaining code points 330 respectively correspond to the standard characters in the string "versgn." The resulting Unicode IDN 340 is "verisign.com" which is visually similar to the original domain name.

In example 310(4), the letter 's' in the word "verisign" has been replaced by an alternate letter s' from the Unicode font set. The punycode IDN 320 "xn- -veriign-mog.com" corresponding to example 310(2) includes punycode element "-mog." This punycode element indicates that an alternative character for the letter 's' is to be inserted in the fifth position of the domain name. The resulting code points 330 after the insertion are 0076 0065 0072 0069 0455 0069 0067 006E, where 0455 is the code point 330 for the alternative letter 's' in the fifth position and the remaining code points 330 respectively correspond to the standard characters in the string "veriign." The resulting Unicode IDN 340 is "verisign.com" which is visually similar to the original domain name.

Finally, in example 310(5), the letter 'n' in the word "verisign" has been replaced by an alternate letter 'n' from the Unicode font set. The punycode IDN 320 "xn- -verisig-rjd.com" corresponding to example 310(2) includes punycode element "-rjd." This punycode element indicates that an alternative character for the letter 'n' is to be inserted in the eighth position of the domain name. The resulting code points 330 after the insertion are 0076 0065 0072 0069 0073 0069 0067 0274, where 0274 is the code point 330 for the alternative letter 'n' in the eighth position and the remaining code points 330 respectively correspond to the standard characters in the string "verisig." The resulting Unicode IDN 340 is "verisign.com" which is visually similar to the original domain name.

In each of examples 310(1) . . . 310(5), a direct string comparison between the punycode IDN 320 and the original domain may not reveal that the punycode IDN 320 and the original domain are visually similar. However, by converting the punycode IDN 320 to code points 330, converting the code points to a Unicode IDN 340, and then performing a lazy OCR on the Unicode IDN 340, such visual similarities may be readily detected.

Figure 4A:
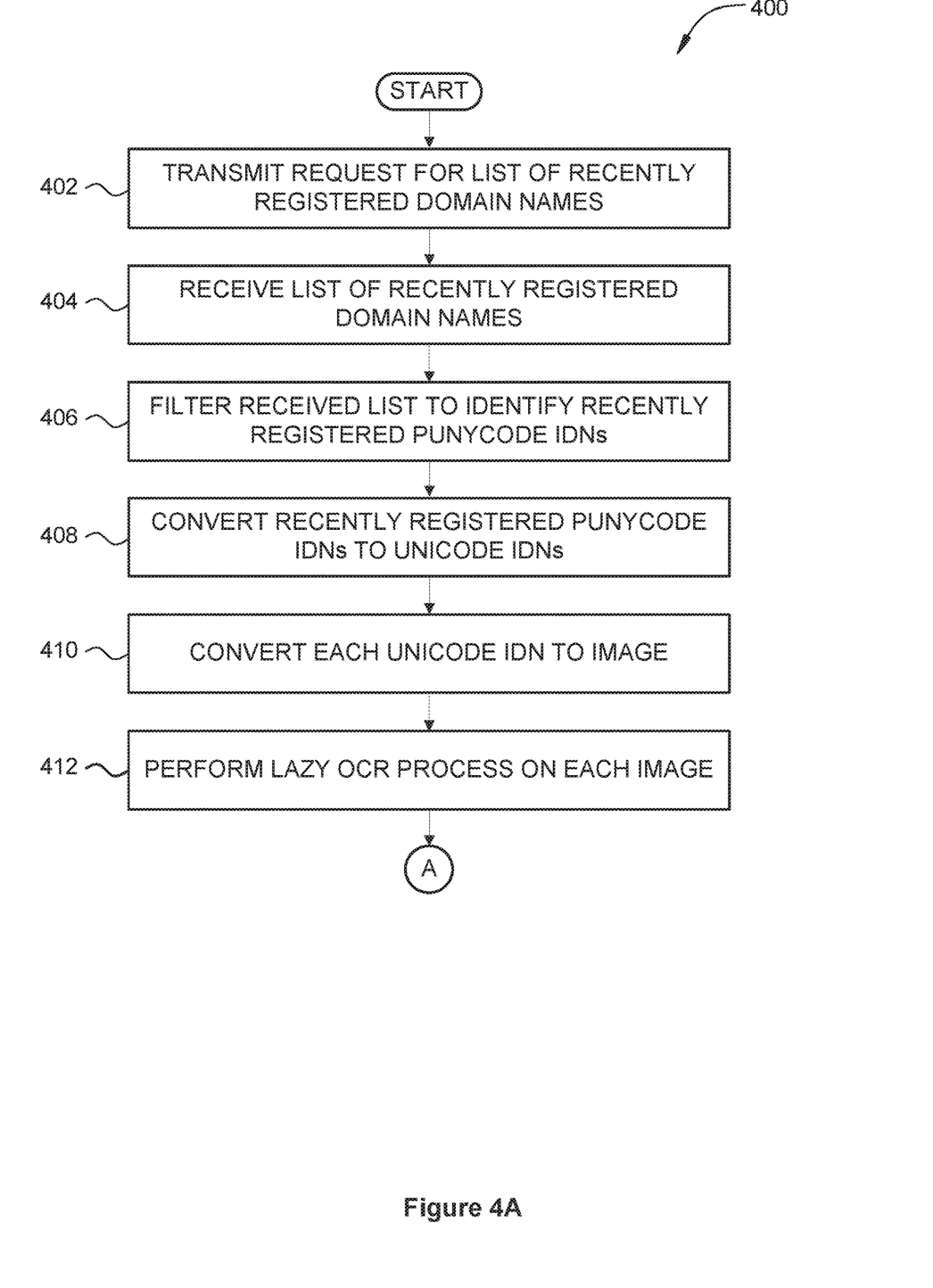
FIGS. 4A-4B set forth a flow diagram of method steps for detecting a homograph attack, according to various embodiments of the present invention.
Figure 4B:
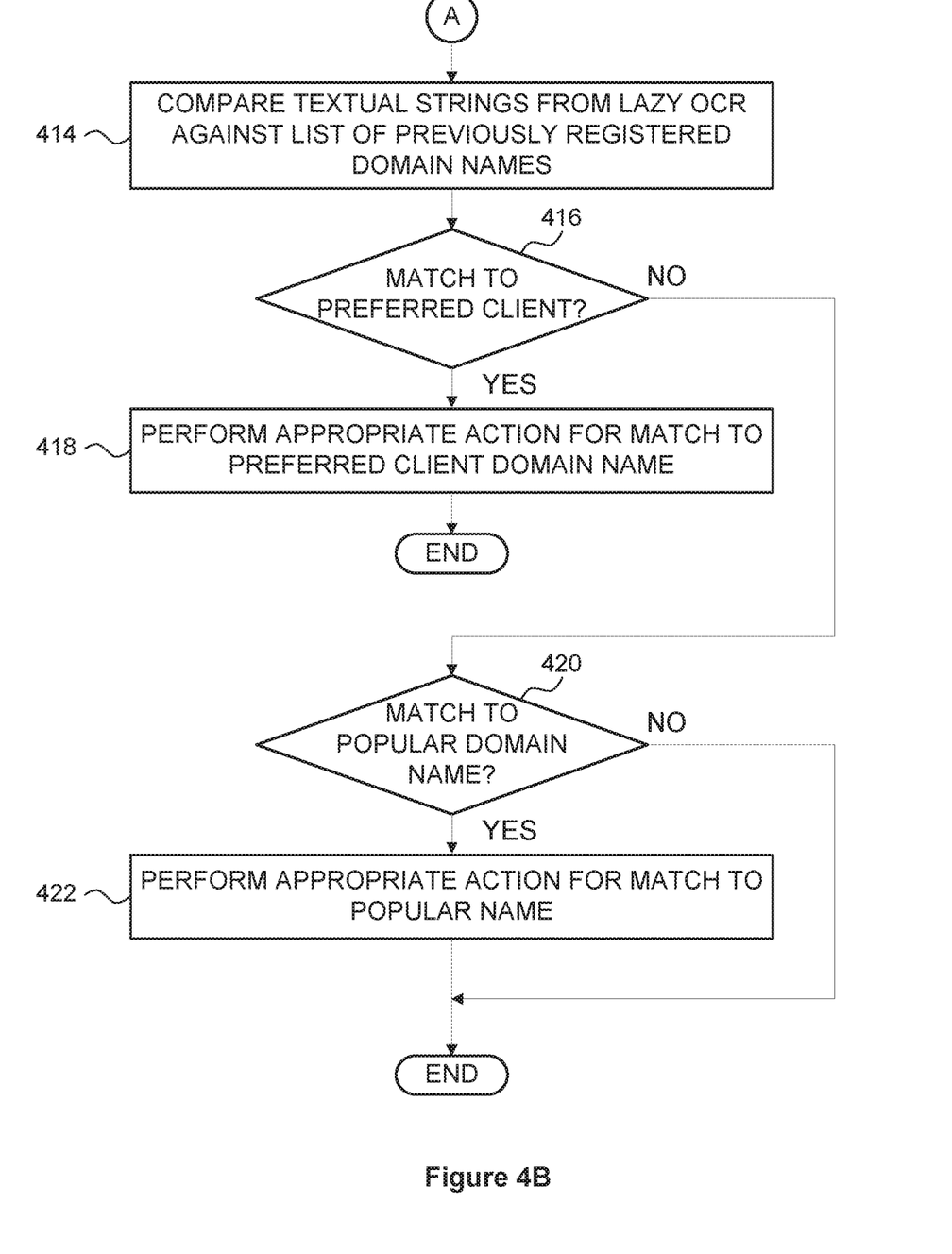

FIGS. 4A-4B set forth a flow diagram of method steps for detecting a homograph attack, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 400 begins at step 402, where IDN collision detection application 232 executing on IDN collision detection server 108 transmits a request to DNS registration server 106 for a list of recently registered domain names. In some embodiments, IDN collision detection application 232 may transmit such requests at periodic intervals, such as once per hour, once per day, or once per week. In some embodiments, IDN collision detection application 232 may request a list of domain names registered within a specified period of time. Alternatively, IDN collision detection application 232 may request a list of domain names registered since the last request.

At step 404, IDN collision detection application 232 receives the list of newly registered domain names from DNS registration server 106 and stores the list in newly registered domain names database 236. At step 406, IDN collision detection application 232 applies a filter to the list of domain names stored in newly registered domain names database 236 to identify newly registered IDNs. In some embodiments, a newly registered domain name is identified as an IDN if the newly registered domain name begins with the string "xn- -". Such IDNs include one or more punycode elements that indicate specific Unicode characters and the location of those Unicode characters within the domain name.

At step 408, IDN collision detection application 232 converts each IDN that includes one or more punycode elements into a corresponding Unicode IDN that includes the Unicode characters specified by the punycode elements and at the correct location relative to other characters in the Unicode IDN. At step 410, IDN collision detection application 232 converts each Unicode IDN into an image. In some embodiments, IDN collision detection application 232 may generate multiple images for each Unicode IDN, where each image corresponds to a different font in a set of fonts. The set of fonts may be a comprehensive list of all fonts recognized by IDN collision detection application 232. Alternatively, the set of fonts may be a list of fonts typically used by various web browsers. In some embodiments, IDN collision detection application 232 may enlarge each image to facilitate OCR.

At step 412, IDN collision detection application 232 performs an OCR operation on each image corresponding to each Unicode IDN to generate a textual string of recognized characters for each image. In some embodiments, IDN collision detection application 232 may perform a relaxed or lazy OCR operation, whereby Unicode characters are mapped to a standard DNS-compliant character that is visually similar to the Unicode character, even if a more rigorous OCR could detect a difference between the standard DNS-compliant character and the Unicode character. At step 414, IDN collision detection application 232 compares each textual string from the OCR operation against a list of previously registered domain names.

At step 416, IDN collision detection application 232 determines whether a textual string from the OCR operation matches a domain name associated with a preferred client. If a textual string from the OCR operation matches a domain name associated with a preferred client, then the method 400 proceeds to step 418, where IDN collision detection application 232 performs an appropriate action. Such an action may include, without limitation, transmitting an alert to a system operator regarding the newly registered IDN, sending an email regarding the newly registered IDN to a user associated with the preferred client, or transmitting a request to DNS registration server 106 to delete the newly registered IDN from the domain name registry.

If, at step 416, the textual string from the OCR operation does not match a domain name associated with a preferred client, then the method 400 proceeds to step 420, where IDN collision detection application 232 determines whether a textual string from the OCR operation matches a domain name associated with a list of popular domain names, such as the top 100,000 domains accessed via the internet. If a textual string from the OCR operation matches a domain name associated with a list of popular domain names, then the method 400 proceeds to step 422, where IDN collision detection application 232 performs an appropriate action. Such an action may include, without limitation, transmitting an alert to a system operator regarding the newly registered IDN, sending an email regarding the newly registered IDN to a user associated with the owner of the popular domain name, and placing the newly registered IDN and the corresponding popular domain name in suspicious domain names list.

The method 400 then terminates.

Figure 5A:
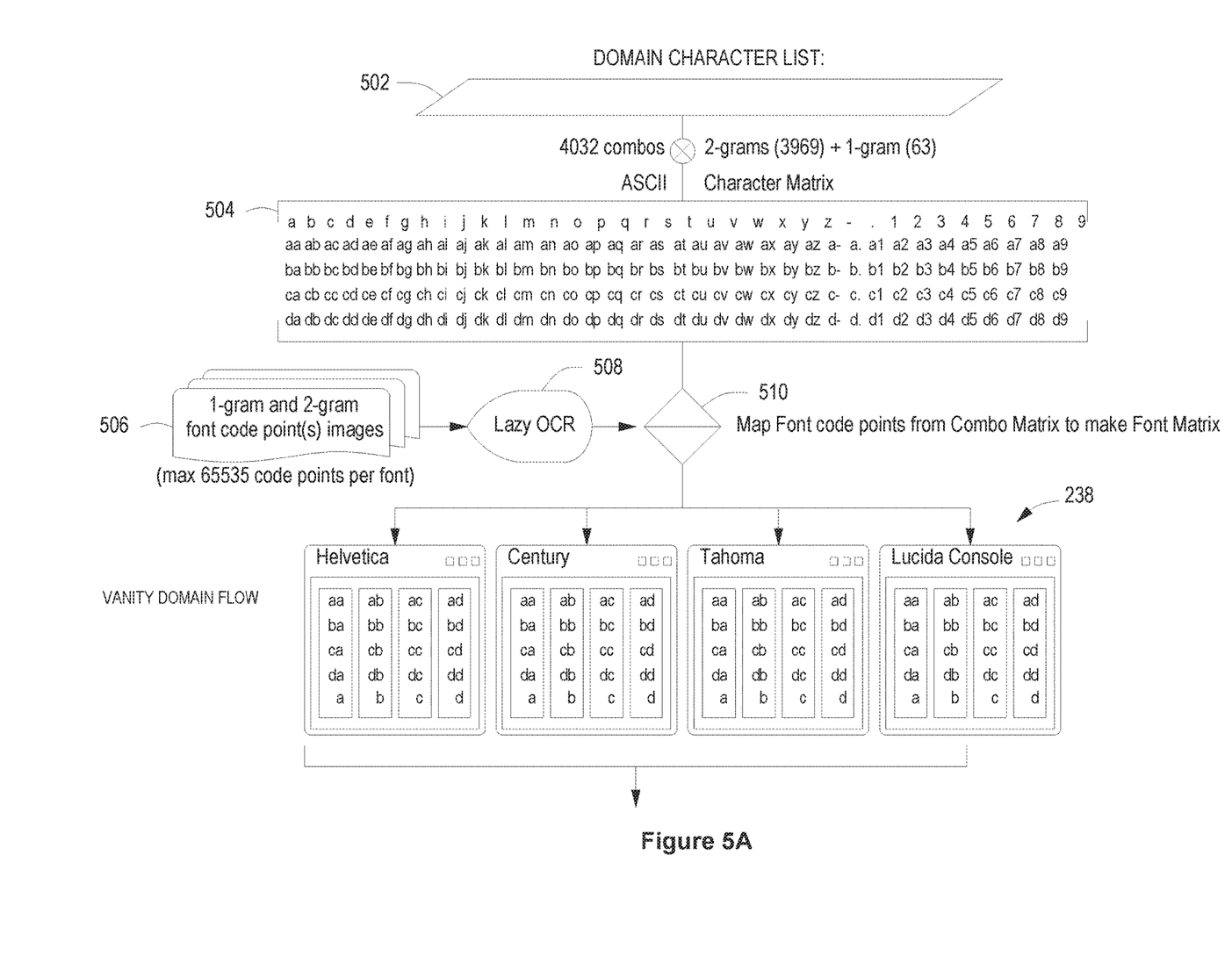
FIGS. 5A-5B illustrate an approach to generating vanity domain names, according to various embodiments of the present invention.
Figure 5B:
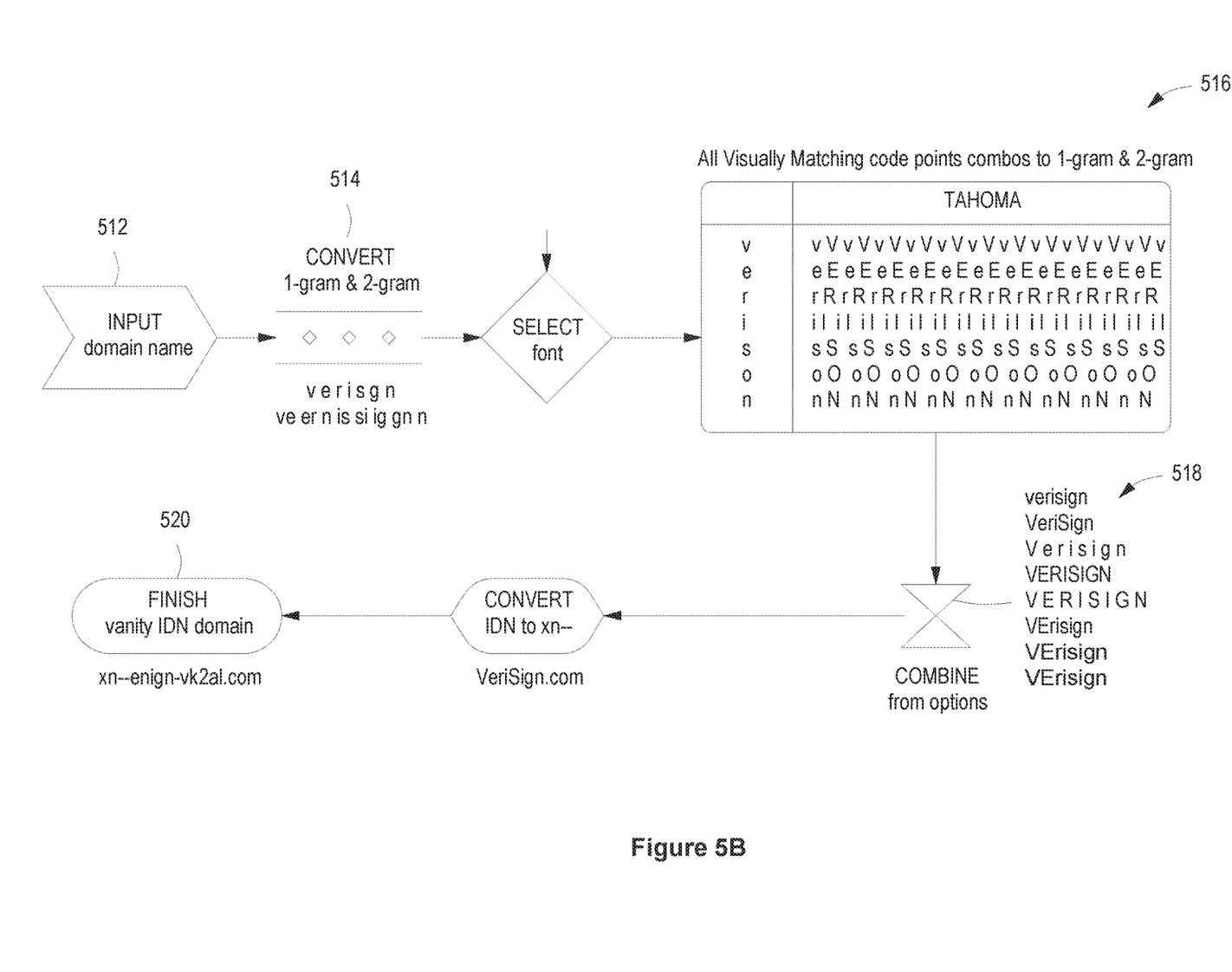

FIGS. 5A-5B illustrate an approach to generating vanity domain names, according to various embodiments of the present invention. As shown, a DNS-compatible character set 502 includes ASCII characters corresponding to the 26 uppercase letters and 26 lowercase letters of the English language, the numbers 0-9, a hyphen '-' character, and a period '.' character. An ASCII character matrix 504 includes all 1-gram and 2-gram combinations of characters included in DNS-compatible character set 502. Font code point images 506 include all images corresponding to 1-gram and 2-gram combinations of code points for a particular font. A lazy OCR operation 508 is performed on all of the images included in font code point images 506. A mapping process 510 compares the results of lazy OCR operation 508 against all 1-gram and 2-gram combinations included in ASCII character matrix 504. All matches between 1-gram and 2-gram combinations included in ASCII character matrix 504 and 1-gram and 2-gram combinations of code points for the particular font are stored in a font matrix for the particular font. This process is repeated for each font in a set of fonts to generate matrix font database 238.

A domain name of interest 512 is received. All sequential 1-gram and 2-gram combinations 514 of the domain name of interest 512 is generated, and a font matrix from matrix font database 238 is selected. A set of visually matching code points 516 is generated, where each visually matching code point is visually similar to one of the sequential 1-gram and 2-gram combinations of the domain name of interest. A set of combinations 518 is generated, where each combination includes one or more of the visually matching code points 516. Each combination is visually similar to the domain name of interest 512. One or more of the combinations included in the set of combinations 518 are then converted to punycode IDNs 520 so that the corresponding punycode IDNs 520 can be registered.

Figure 6:
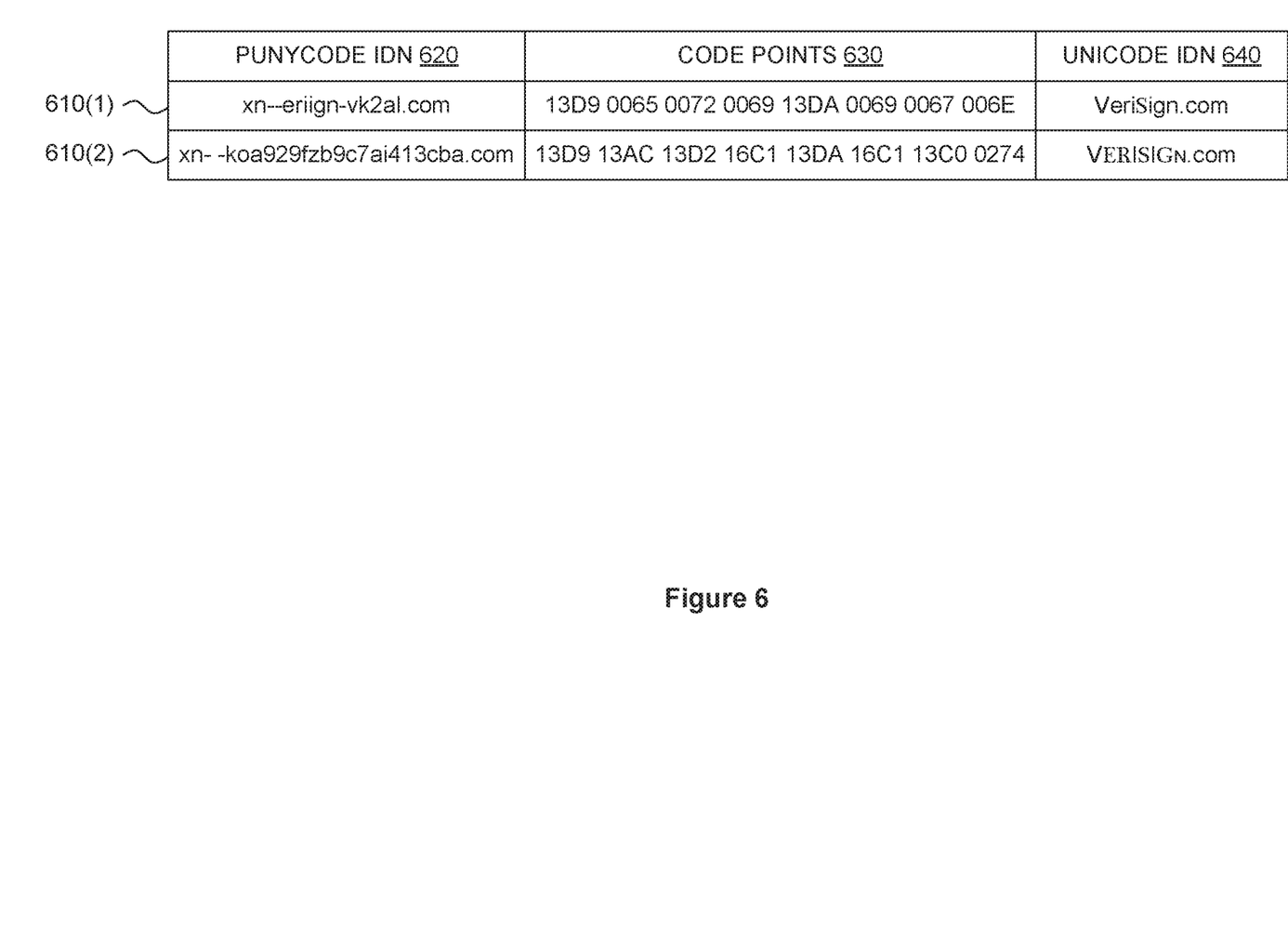
FIG. 6 illustrates examples of different vanity IDNs generated via the approach of FIGS. 5A-5B, according to various embodiments of the present invention.

FIG. 6 illustrates examples 610(1), 610(2) of different vanity IDNs generated via the approach of FIGS. 5A-5B, according to various embodiments of the present invention. As shown, each of examples 610(1), 610(2) includes a punycode IDN 620, code points 630, and a Unicode IDN 640. Each of the examples 610(1), 610(2) defines a homograph IDN corresponding to the verisign.com domain.

In example 610(1), the letters 'v' and 's' in the word "verisign" have been replaced by stylized letters 'v' and 's' from the Unicode font set. The punycode IDN 620 "xn- -eriign-vk2al.com" corresponding to example 610(1) includes punycode elements "-vk2al." This punycode elements indicate that stylized characters for the letters 'v' and 's' are to be inserted in the first position and fifth position, respectively, of the domain name. The resulting code points 630 after the insertion are 13D9 0065 0072 0069 13DA 0069 0067 006E, where 13D9 is the code point 330 for the stylized letter 'v' in the first position, 13DA is the code point 330 for the stylized letter 's' in the fifth position, and the remaining code points 330 respectively correspond to the standard characters in the string "eriign." The resulting Unicode IDN 340 is "VeriSign.com" which is visually similar to the original domain name.

In example 610(2), all of the letters in the word "verisign" have been replaced by stylized letters from the Unicode font set. The punycode IDN 320 "xn- -koa929-fzb9c7ai413cba.com" corresponding to example 610(2) includes punycode element "-koa929fzb9c7ai413cba." This punycode element indicates that stylized character for all of the letters in "verisign" are to be inserted in the domain name. The resulting code points 330 after the insertion are 13D9 13AC 13D2 16C1 13DA 16C1 13C0 0274, where all code points 330 are for stylized letters in the string "verisign." The resulting Unicode IDN 340 is "VERI SI G$_N$.com" which is visually similar to the original domain name.

In each of examples 610(1), 610(2), a direct string comparison between the punycode IDN 620 and the original domain may not reveal that the punycode IDNs 620 and the original domain are visually similar. However, by determining that the corresponding Unicode IDN 640 are visually similar to the original domain name, the punycode IDNs 620 can be registered as vanity IDNs or to reduce the risk of homograph attacks.

Figure 7A:
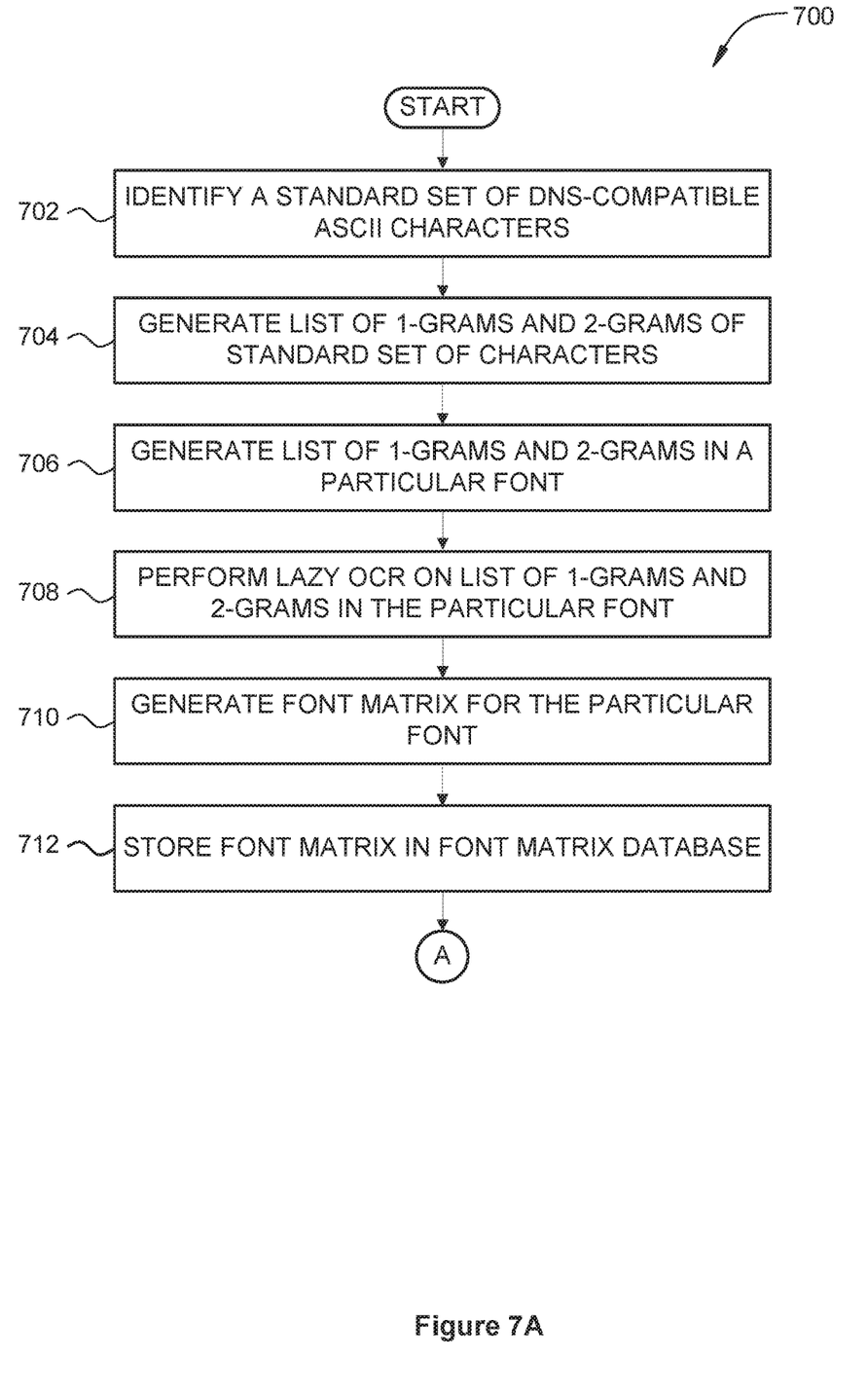
FIGS. 7A-7B set forth a flow diagram of method steps for generating a homographic vanity names associated with a domain name, according to various embodiments of the present invention.
Figure 7B:
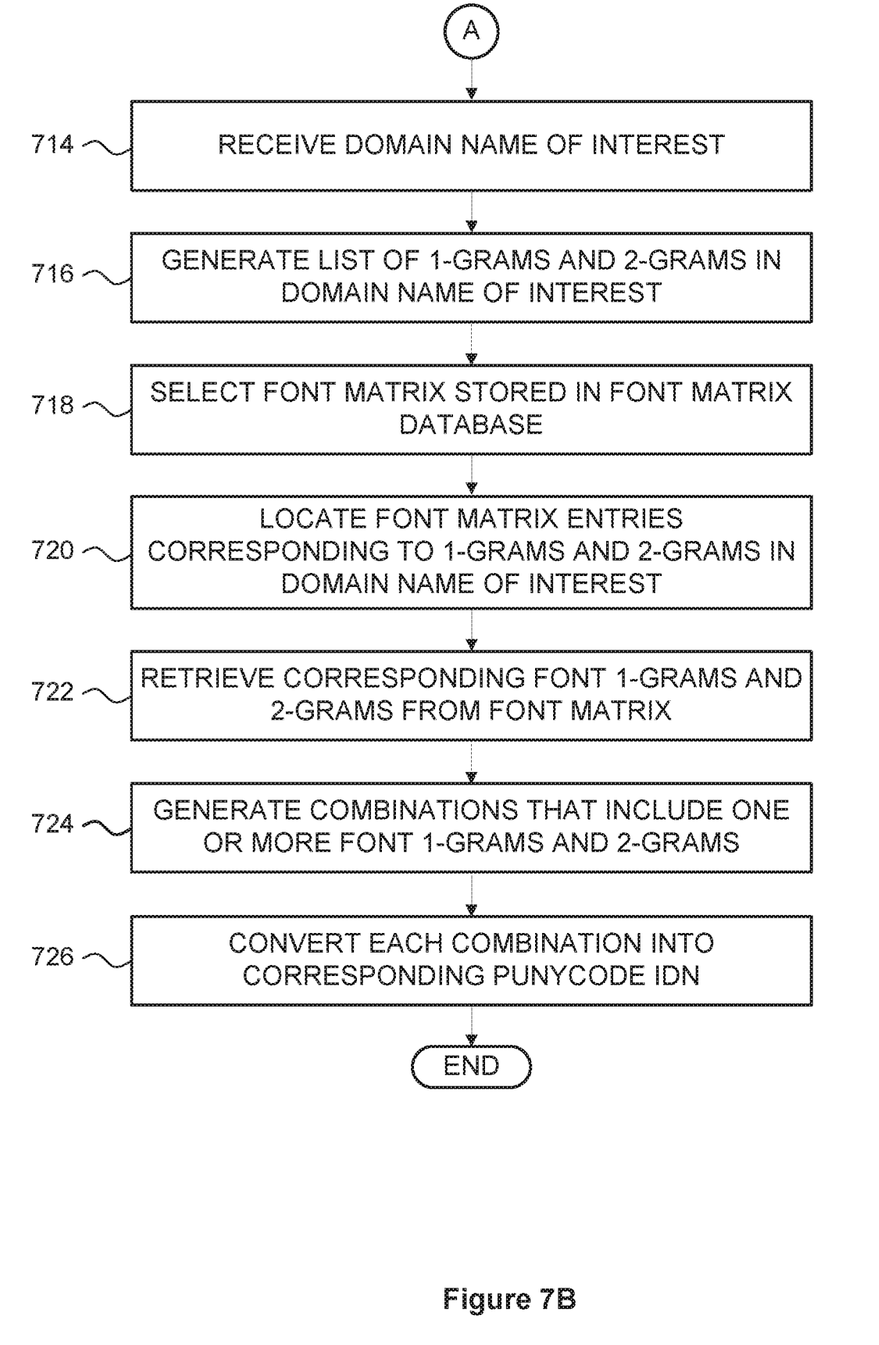

FIGS. 7A-7B set forth a flow diagram of method steps for generating a homographic vanity names associated with a domain name, according to various embodiments of the present invention. Although the method steps are described in conjunction with the systems of FIGS. 1-3 and 5A-6, persons of ordinary skill in the art will understand that any system configured to perform the method steps, in any order, is within the scope of the present invention.

As shown, a method 700 begins at step 702, where vanity IDN generation application 234 executing on IDN collision detection server 108 identifies a standard set of alphanumeric ASCII characters and other punctuation characters that can be included in a DNS-compatible domain name. For example, the standard set of ASCII characters could be the 26 uppercase letters and 26 lowercase letters of the English language, the numbers 0-9, a hyphen '-' character, and a period '.' character. At step 704, vanity IDN generation application 234 generates a list of all 1-gram and 2-gram combinations of the standard set of ASCII characters.

At step 706, vanity IDN generation application 234 generates a list of all 1-gram and 2-gram combinations of code points in a particular font. In some embodiments, the particular font could include 65,535 code points. At step 708, performs a lazy OCR on each 1-gram and 2-gram combination of code points in the particular font. At step 708, vanity IDN generation application 234 identifies 1-grams and 2-grams of the standard set of ASCII characters to the textual strings of recognized characters from the OCR operation. At step 710, generates a font matrix for the particular font. The font matrix includes each 1-gram and 2-gram of the standard set of ASCII characters that matches a textual string of recognized characters from the OCR operation along with the corresponding 1-gram and 2-gram of the particular font. At step 712, vanity IDN generation application 234 stores the font matrix in font matrix database 238. In some embodiments, vanity IDN generation application 234 may repeat steps 706 through 712 for each font in a particular set of fonts.

At step 714, vanity IDN generation application 234 receives a domain name of interest. At step 716, vanity IDN generation application 234 generates a list of sequential list of 1-gram and 2-gram combinations present in the domain name of interest. At step 718, vanity IDN generation application 234 selects a font matrix stored in font matrix database 238. At step 720, for each 1-gram and 2-gram combinations present in the domain name of interest, vanity IDN generation application 234 locates entries in the font matrix of corresponding 1-gram and 2-gram of the standard set of ASCII characters, if any. At step 722, vanity IDN generation application 234 retrieves the corresponding 1-grams and 2-grams of the particular font from the font matrix. At step 724, vanity IDN generation application 234 generates combinations that include one or more 1-grams and 2-grams of the particular font, where each such combination is visually similar to the domain name of interest. At step 726, 1-grams and 2-grams of the particular font converts each combination into a corresponding punycode IDN that begins with "xn- -" and includes one or more punycode elements.

The method 700 then terminates.

In sum, newly registered international domain names (IDNs) are analyzed to determine if the newly registered IDNs collide with existing domain names. For each newly registered IDN, a punycode representation of the IDN is converted into a corresponding Unicode IDN. An image of the Unicode IDN is created for a particular font. The image may be enlarged to facilitate OCR. A lazy OCR operation is performed on the resulting image. The textual string resulting from the OCR operation is compared against a list of previously registered domain names. If the textual string matches a domain name in the list of previously registered domain names, then the newly registered IDN is identified as suspicious. Such suspicious IDNs may indicate a potential homograph attack against the previously registered domain name.

At least one advantage of the disclosed techniques is that potentially malicious IDNs associated with homograph attacks are automatically detected shortly after the malicious IDNs are registered. IDNs that are visually similar to previously registered domain names are automatically detected without the need to manually update a registry of malicious IDNs. As a result, the malicious IDNs are detected and mitigated in less time relative to prior approaches.

1. In some embodiments, a computer-implemented method for detecting a homograph attack comprises: retrieving a first domain name that includes a punycode element; converting the first domain into a second domain name that includes a Unicode character corresponding to the punycode element; converting the second domain name into an image; performing one or more optical character recognition operations on the image to generate a textual string associated with the image; and determining that the textual string matches at least a portion of a third domain name.

2. The computer-implemented method of clause 1, further comprising: receiving a list of recently registered domain names from a domain name system (DNS) registration server, and determining that the list includes the first domain name.

3. The computer-implemented method of clause 1 or clause 2, wherein the third domain name is included in a list of preferred client domain names, and further comprising notifying an entity associated with the third domain name that the first domain name is related to a homographic attack on the first domain name.

4. The computer-implemented method of any of clauses 1-3, wherein the third domain name is included in a list of popular domain names, and further comprising updating a database to associated the first domain name as a homograph attack on the third domain name.

5. The computer-implemented method of any of clauses 1-4, further comprising transmitting a request to a DNS registration server to delete the first domain name from a domain name registry.

6. The computer-implemented method of any of clauses 1-5, wherein performing one or more optical character recognition operations on the image comprises mapping a portion of the image associated with the Unicode character to one or more standard DNS-compliant characters.

7. The computer-implemented method of any of clauses 1-6, further comprising: determining that the Unicode character is not defined in a first font associated with the second domain name; and in response, identifying the first domain name as a non-suspicious domain name.

8. The computer-implemented method of any of clauses 1-7, wherein the Unicode character is visually similar to a first character included in the third domain name.

9. In some embodiments, a non-transitory computer-readable storage medium includes instructions that, when executed by a processor, cause the processor to generate a homographic vanity names associated with a domain name, by performing the steps of: identifying a first combination of one or more characters within a first domain name; determining that the first combination of one or more characters is visually similar to a second combination of one or more characters associated with a first font; and generating a second domain name that is visually similar to the first domain name and includes a Unicode character associated with the second combination of one or more characters.

10. The non-transitory computer-readable storage medium of clause 9, wherein the second combination of one or more characters is included in a font matrix that associates the second combination of one or more characters with the first combination of one or more characters.

11. The non-transitory computer-readable storage medium of clause 9 or clause 10, further comprising: converting the second combination of one or more characters into an image; performing one or more optical character register operations on the image to generate a textual string associated with the image; determining that the textual string matches a third combination of one or more characters included in a first set of characters that are compatible with domain name system (DNS) domain names; and adding an entry to a font matrix that associates the second combination of one or more characters with the third combination of one or more characters.

12. The non-transitory computer-readable storage medium of any of clauses 9-11, wherein determining that the first combination of one or more characters is visually similar to the second combination of one or more characters comprises identifying that the third combination of one or more characters matches the first combination of one or more characters.

13. The non-transitory computer-readable storage medium of any of clauses 9-12, wherein the first combination of one or more characters is included in a first set of characters that is compatible with DNS domain names.

14. The non-transitory computer-readable storage medium of any of clauses 9-13, wherein the second combination of one or more characters includes at least one character that is not included in a first set of characters that are compatible with DNS domain names.

15. The non-transitory computer-readable storage medium of any of clauses 9-14, further comprising converting the second domain name into a third domain name that includes a punycode element corresponding to the second combination of one or more characters.

16. The non-transitory computer-readable storage medium of any of clauses 9-15, further comprising transmitting a request to register the third domain name to a DNS registration server.

17. In some embodiments, acomputing device, comprises: a memory that includes a IDN collision detection application; and a processor that is coupled to the memory and, when executing the IDN collision detection application, is configured to: retrieve a first domain name that includes a punycode element; convert the first domain into a second domain name that includes a Unicode character corresponding to the punycode element; convert the second domain name into an image; perform one or more optical character recognition operations on the image to generate a textual string associated with the image; and determine that the textual string matches at least a portion of a third domain name.

18. The computing device of clause 17, wherein the processor is further configured to: receive a list of recently registered domain names from a domain name system (DNS) registration server, and determine that the list includes the first domain name.

19. The computing device of clause 17 or clause 18, wherein the third domain name is included in a list of preferred client domain names, and wherein the processor is further configured to notify an entity associated with the third domain name that the first domain name is related to a homographic attack on the first domain name.

20. The computing device of any of clauses 17-19, wherein the third domain name is included in a list of popular domain names, and wherein the processor is further configured to update a database to associated the first domain name as a homograph attack on the third domain name.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for detecting a homograph attack, the method comprising:
   retrieving a first domain name that includes a punycode element;
   converting the first domain name into a second domain name that includes a Unicode character corresponding to the punycode element;
   converting the second domain name into an image;
   performing one or more optical character recognition operations on the image to generate a textual string associated with the image; and
   determining that the textual string matches at least a portion of a third domain name.

2. The computer-implemented method of claim 1, further comprising:

receiving a list of recently registered domain names from a domain name system (DNS) registration server; and determining that the list includes the first domain name.

3. The computer-implemented method of claim 1, wherein the third domain name is included in a list of preferred client domain names, and further comprising notifying an entity associated with the third domain name that the first domain name is related to a homographic attack on the third domain name.

4. The computer-implemented method of claim 1, wherein the third domain name is included in a list of popular domain names, and further comprising updating a database to associate the first domain name as a homograph attack on the third domain name.

5. The computer-implemented method of claim 1, further comprising transmitting a request to a DNS registration server to delete the first domain name from a domain name registry.

6. The computer-implemented method of claim 1, wherein performing one or more optical character recognition operations on the image comprises mapping a portion of the image associated with the Unicode character to one or more standard DNS-compliant characters.

7. The computer-implemented method of claim 1, further comprising:
determining that the Unicode character is not defined in a first font associated with the second domain name; and
in response, identifying the first domain name as a non-suspicious domain name.

8. The computer-implemented method of claim 1, wherein the Unicode character is visually similar to a first character included in the third domain name.

9. A non-transitory computer-readable storage medium including instructions that, when executed by a processor, cause the processor to generate homographic vanity names associated with a domain name, by performing steps comprising:
identifying a first combination of one or more characters within a first domain name that includes domain name system (DNS)-compliant characters but not punycode elements;
determining that the first combination of one or more characters is visually similar to a second combination of one or more characters associated with a first font, wherein the determination is based on a font matrix indicating an association of the second combination of one or more characters with the first combination of one or more characters, and wherein the association is determined by:
performing one or more optical character recognition operations on an image of the second combination of one or more characters to generate a textual string associated with the image, and
determining that the textual string matches the first combination of one or more characters; and
generating a second domain name that is visually similar to the first domain name and includes at least one Unicode character associated with the second combination of one or more characters.

10. The non-transitory computer-readable storage medium of claim 9, wherein a database includes the font matrix that associates the second combination of one or more characters with the first combination of one or more characters.

11. The non-transitory computer-readable storage medium of claim 9, wherein the first combination of one or more characters is included in a first set of characters that are compatible with DNS domain names.

12. The non-transitory computer-readable storage medium of claim 9, wherein the second combination of one or more characters includes at least one character that is not included in a first set of characters that are compatible with DNS domain names.

13. The non-transitory computer-readable storage medium of claim 9, the steps further comprising converting the second domain name into a third domain name that includes a punycode element corresponding to the second combination of one or more characters.

14. The non-transitory computer-readable storage medium of claim 13, the steps further comprising transmitting a request to register the third domain name to a DNS registration server.

15. A computing device, comprising:
a memory that includes an international domain name (IDN) collision detection application; and
a processor that is coupled to the memory and, when executing the IDN collision detection application, is configured to:
retrieve a first domain name that includes a punycode element,
convert the first domain name into a second domain name that includes a Unicode character corresponding to the punycode element,
convert the second domain name into an image,
perform one or more optical character recognition operations on the image to generate a textual string associated with the image, and
determine that the textual string matches at least a portion of a third domain name.

16. The computing device of claim 15, wherein the processor is further configured to:
receive a list of recently registered domain names from a domain name system (DNS) registration server; and
determine that the list includes the first domain name.

17. The computing device of claim 15, wherein the third domain name is included in a list of preferred client domain names, and wherein the processor is further configured to notify an entity associated with the third domain name that the first domain name is related to a homographic attack on the third domain name.

18. The computing device of claim 15, wherein the third domain name is included in a list of popular domain names, and wherein the processor is further configured to update a database to associate the first domain name as a homograph attack on the third domain name.

* * * * *